(12) United States Patent
Nakamura

(10) Patent No.: US 8,881,780 B2
(45) Date of Patent: Nov. 11, 2014

(54) PNEUMATIC TIRE

(75) Inventor: Takamitsu Nakamura, Kodaira (JP)

(73) Assignee: Bridgestone Corporation, Tokyo (JP)

(*) Notice: Subject to any disclaimer, the term of this patent is extended or adjusted under 35 U.S.C. 154(b) by 974 days.

(21) Appl. No.: 13/004,000

(22) PCT Filed: Jul. 8, 2009

(86) PCT No.: PCT/JP2009/062465
§ 371 (c)(1),
(2), (4) Date: Jan. 13, 2011

(87) PCT Pub. No.: WO2010/007924
PCT Pub. Date: Jan. 21, 2010

(65) Prior Publication Data
US 2011/0120609 A1 May 26, 2011

(30) Foreign Application Priority Data
Jul. 15, 2008 (JP) .................................. 2008-183931

(51) Int. Cl.
*B60C 11/12* (2006.01)
*B60C 11/03* (2006.01)

(52) U.S. Cl.
CPC ............. *B60C 11/12* (2013.01); *B60C 11/0302* (2013.04); *B60C 11/0306* (2013.04); *B60C 2011/0348* (2013.04); *B60C 2011/0374* (2013.04); *B60C 2011/0393* (2013.04); *B60C 2011/0395* (2013.04)
USPC ................................. 152/209.18; 152/209.27

(58) Field of Classification Search
CPC B60C 11/0302; B60C 11/0306; B60C 11/04; B60C 11/11; B60C 11/12; B60C 2011/0348; B60C 2011/0374; B60C 2011/0393; B60C 2011/0395
USPC ............ 152/209.18, 209.25, 209.27, 209.13, 152/209.16; D12/525–532, 557–567, D12/592–603, 900
See application file for complete search history.

(56) References Cited

U.S. PATENT DOCUMENTS 5,885,384 A 3/1999 Himuro
7,077,181 B2 7/2006 Hirai (Continued)

FOREIGN PATENT DOCUMENTS

CN 2671837 Y 1/2005
CN 101115633 A 1/2008

(Continued)

OTHER PUBLICATIONS

DE 19900266, Oct. 2000, English language machine translation [retrieved May 7, 2014 from www.epo.org].*

(Continued)

*Primary Examiner* — Eric Hug
(74) *Attorney, Agent, or Firm* — Sughrue Mion, PLLC

(57) ABSTRACT

A tire with sufficient braking performance on dry and wet roads, reduced rolling resistance and abrasion resistance. Tread 12 has first circumferential direction groove 14 and first fine grooves 18 with wall faces that contact each other when the tread 12 contacts the ground, the grooves 14 and 18 partitioning center ribs 16. Center blocks 24 are partitioned by second circumferential direction grooves 20 outside the grooves 18 and center lug grooves 22 extending from respective groove 18 to respective groove 20. First sipes 40 are formed in the center blocks 24 extending circumferentially from wall face 24B toward wall face 24C and terminating within the block. Second sipes 42 are formed in the surface of center blocks 24 extending circumferentially from wall face 24C toward wall face 24B, and curving around before reaching wall face 24B, being open to wall face 24A, and not intersecting first sipes 40.

2 Claims, 3 Drawing Sheets

(56) References Cited

U.S. PATENT DOCUMENTS

| | | | | |
|---|---|---|---|---|
| 7,954,527 | B2 * | 6/2011 | Ohara | 152/209.17 |
| 2004/0020577 | A1 * | 2/2004 | Hirai | 152/526 |

FOREIGN PATENT DOCUMENTS

| | | | |
|---|---|---|---|
| DE | 19900266 | * | 10/2000 |
| EP | 0 887 209 | * | 12/1998 |
| EP | 0 965 464 | * | 12/1999 |
| EP | 1 541 381 A1 | | 6/2005 |
| JP | 9-328003 A | | 12/1997 |
| JP | 2004-058839 A | | 2/2004 |
| JP | 2004-352049 A | | 12/2004 |
| JP | 2007-216871 A | | 8/2007 |
| JP | 2007-302071 | * | 11/2007 |
| JP | 2007-302071 A | | 11/2007 |

OTHER PUBLICATIONS

International Search Report of PCT/JP2009/062465 dated Oct. 6, 2009.
Extended European Search Report, dated Dec. 18, 2013, issued in corresponding European Patent Application No. 09797849.8.
Japanese Office Action dated Oct. 30, 2012 issued in Japanese Patent Application No. 2008-183931.
Chinese Office Action, dated Jun. 18, 2013, issued in corresponding Chinese Patent Application No. 200980127480.5.

* cited by examiner

PNEUMATIC TIRE

CROSS REFERENCE TO RELATED APPLICATIONS

This application is a National Stage of International Application No. PCT/JP2009/062465 filed Jul. 8, 2009, claiming priority based on Japanese Patent Application No. 2008-183931 filed Jul. 15, 2008, the contents of all of which are incorporated herein by reference in their entirety.

TECHNICAL FIELD

The present invention relates to a pneumatic tire and in particular to a pneumatic tire for an automobile.

BACKGROUND ART

In conventional pneumatic tires, in order to secure braking performance using an edge effect a form is adopted in which circumferential direction grooves, extending along a circumferential direction, and lug grooves, extending substantially along the width direction, are formed in the tread, partitioning the tread into plural blocks (see, for example, Patent Document 1).

Patent Document 1

Japanese Patent Application Laid-Open No. 09-328003.

DISCLOSURE OF INVENTION

Technical Problem

However, pneumatic tires disposed with grooves in the above described manner suffer from the problem that edge portions at the lug groove sides of the blocks are curled up by friction with the road surface, and sufficient braking performance cannot be secured. With a low coefficient of friction surfaces, such as a wet road surface, braking performance can be secured to a certain extent due to effective action of the edges at the lug groove sides of the blocks, however further improvements in the braking performance on wet roads are called for by the market place. There are also demands from the market place for a reduction in tire rolling resistance and securing tire abrasion resistance.

In the light of the above, an object of the present invention is to provide a pneumatic tire that reduces rolling resistance and secures abrasion resistance while securing sufficient braking performance on dry roads and wet roads.

Solution to Problem

A pneumatic tire of the first aspect includes: plural circumferential direction grooves formed in a tread and extending along a tire circumferential direction; a fine groove formed in the tread between the circumferential direction grooves so as to partition a rib extending in a tire circumferential direction, the fine groove having a width that is narrower than the circumferential direction grooves, and the groove walls of the fine groove making contact with each other when the tread makes contact with the ground and undergoes compressive deformation; plural lug grooves formed in the tread, the lug grooves extending from the fine groove in a direction that intersects with the fine groove, and partitioning blocks adjacent to the rib; first sipes that are formed in the surface of the blocks, extending along the tire circumferential direction from a first wall face at a lug groove side of the block toward a second wall face at a lug groove side of the block, with the first sipes terminating within the block; second sipes that are formed in the surface of the blocks, the second sipes extending along the tire circumferential direction from the second wall face at a lug groove side of the block toward the first wall face at a lug groove side of the block, and the second sipes curving around, at an intermediate portion between the second wall face and the first wall face, toward a wall face at the fine groove side of the block, with the second sipes open to the wall face at the fine groove side and not intersecting with the first sipes when seen in plan view.

According to the pneumatic tire of the first aspect, when force is imparted thereto in the tire circumferential direction on a dry road, for example under braking, even if edge portions at the lug groove side of the blocks and the blocks attempt to curl up due to friction with the road surface, when the tread is in contact with the ground, the tread undergoes compressive deformation, and since the groove walls of the fine groove make contact with each other, namely the wall face of the blocks and the wall face of the rib make contact, the rib acts to suppress deformation of the blocks by suppressing the edge portions from curling up at the lug groove sides of the blocks. Consequently sufficient braking performance is exhibited on a dry road.

On a wet road, when under braking the edges at the lug groove sides of the blocks effectively act and braking performance is exhibited. In addition, since water expelling performance is higher due to the first sipes and the second sipes extending along the tire circumferential direction on the surface of the blocks, sufficient braking performance can hence be exhibited. In particular, since the second sipes also open to the fine groove, water expelling performance can be effectively raised.

In addition, since the first sipes do not intersect with the second sipes when seen in plan view, namely since the blocks are not sectioned along the tire circumferential direction by the first sipes and the second sipes, a reduction in rigidity of the blocks in the tire width direction is suppressed, and a reduction in abrasion resistance of the blocks is suppressed. Thereby the water expelling performance can be raised while securing the abrasion resistance.

Furthermore, when force is input to the tread in the tire width direction, the blocks attempt to deform in the tire width direction, however, since the rib adjacent to the blocks suppress deformation of the blocks in the tire width direction, heat generation caused by internal friction in the rubber configuring the blocks is reduced, and a reduction in the rolling resistance of the tire is enabled. A contribution can thereby be made to lowering the fuel consumption of the vehicle.

Note that the pneumatic tire of the first aspect also enables curling up of the edge portions at the lug groove sides of the blocks during acceleration to be suppressed.

In the pneumatic tire of the second aspect the blocks are partitioned into respective blocks on a central portion of the tread, and respective blocks on shoulder portions of the tread at the outside on both sides of the central portion in the tire width direction, and the length of the blocks in the tire circumferential direction on the shoulder portions is a length that is 20% to 80% of the length of the blocks on the central portion in the tire circumferential direction.

According to the pneumatic tire of the second aspect, when the length of the blocks on the shoulder portions in the tire circumferential direction is a length that is 20% to 80% of the length of the blocks on the central portion in the tire circumferential direction, the braking performance can be effectively exhibited due to reducing the number of occasions for the edge portions at the lug groove sides of the blocks on the center portion to attempt to curl up due to friction between the surface of the blocks on the center portion and the road surface. It should be noted that when 80% is exceeded, the number of occasions for the edge portions at the lug groove sides of the blocks on the center portion to attempt to curl up is too high, and when less than 20%, since the number of edges at the lug groove sides of the blocks on the center portion is reduced, sufficient edge effect cannot be obtained.

Advantageous Effects of Invention

As explained above, the pneumatic tire of the present invention reduces rolling resistance and secures abrasion resistance while securing sufficient braking performance on dry roads and wet roads.

BEST MODE FOR CARRYING OUT THE INVENTION

Explanation will now be give of details of an exemplary embodiment of the present exemplary embodiment, with reference to the drawings.

Figure 1:
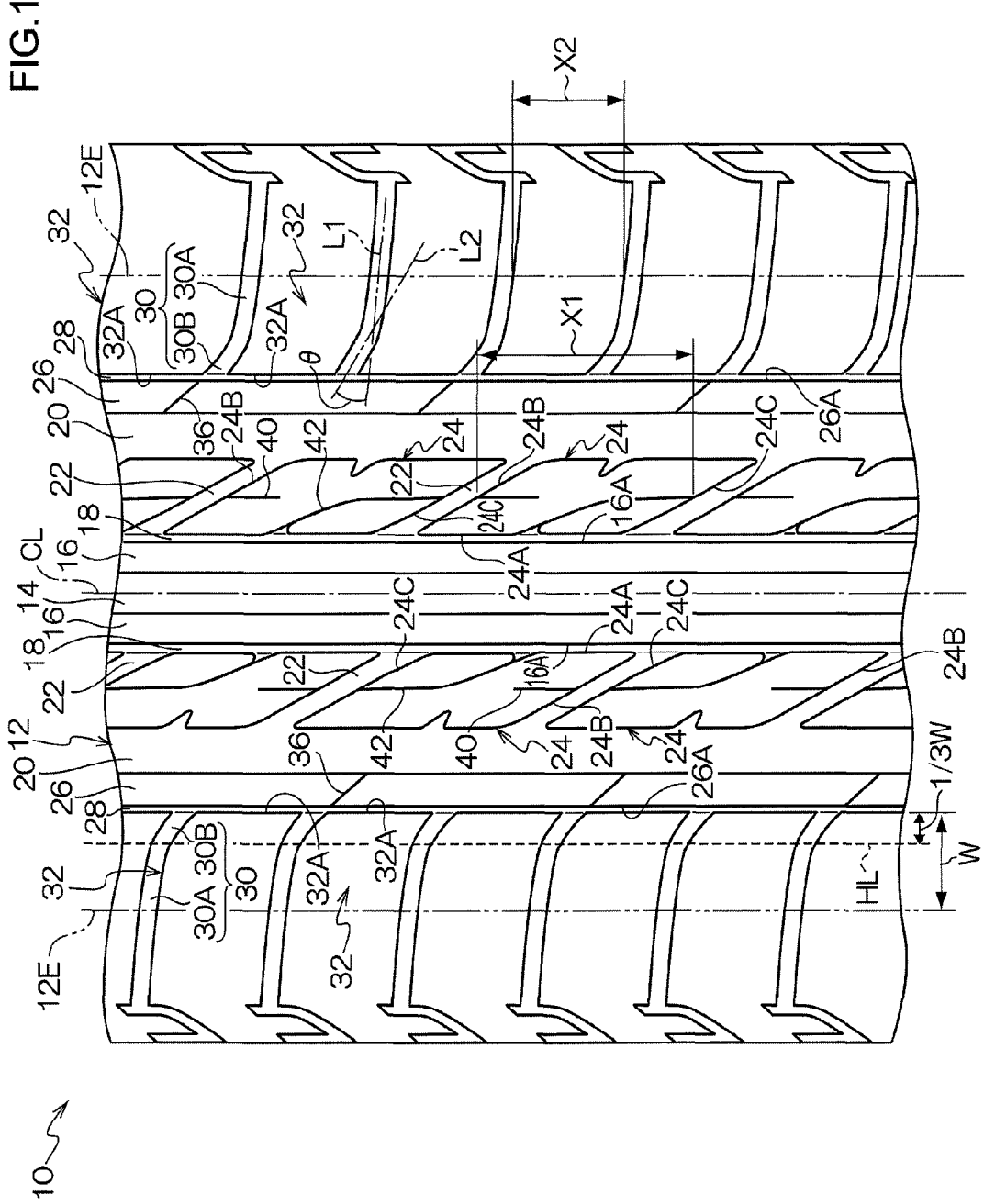
FIG. 1 is a plan view of a tread of a pneumatic tire of a first exemplary embodiment.

As shown in FIG. 1, a first circumferential direction groove 14 is formed in the tire circumferential direction along the tire equatorial plane CL of a tread 12 of a pneumatic tire 10 of the first exemplary embodiment. First fine grooves 18 are formed along the tire circumferential direction at both width direction outsides of the first circumferential direction groove 14, with center ribs 16, extending continuously along the tire circumferential direction, partitioned between the first circumferential direction groove 14 and the respective first fine groove 18. Note that the center ribs 16 in the present exemplary embodiment are plane ribs, not formed with any grooves or sipes.

Note that in the drawings the reference number 12E indicates the edge of the ground contact of the tread 12. The ground contact edge 12E is the outermost ground contact portion of the tire in the width direction when the pneumatic tire 10 is mounted to a standard rim, as defined in the JATMA YEAR BOOK (2008 edition, Japan Automobile Tire Manufacturers Association standards), inflated to a pressure (maximum pressure) of 100% of the internal corresponding to the maximum load capacity (load shown in bold in the internal pressure-load capacity correspondence table) for the applicable size/ply rating in the JATMA YEAR BOOK, and with a load of the maximum load capacity applied thereto. It should be noted that where the location of use or manufacturing location use TRA standards or ETRTO standards, then these respective standards are applied. In the present exemplary embodiment the tread pattern of the pneumatic tire 10 is shaped symmetrically about the single dot intermittent line of the tire equatorial plane CL, however the present invention is not limited thereto.

Second circumferential direction grooves 20 are formed along the tire circumferential direction at the tire width direction outside of the first fine grooves 18. Plural center lug grooves 22 are formed at intervals along the tire circumferential direction. The center lug grooves 22 are formed at an angle to the tire width direction between the first fine grooves 18 and the second circumferential direction grooves 20 and connect the first fine grooves 18 to the second circumferential direction grooves 20. Plural center blocks 24 are partitioned by the first fine grooves 18, the second circumferential direction grooves 20 and the center lug grooves 22.

Figure 2:
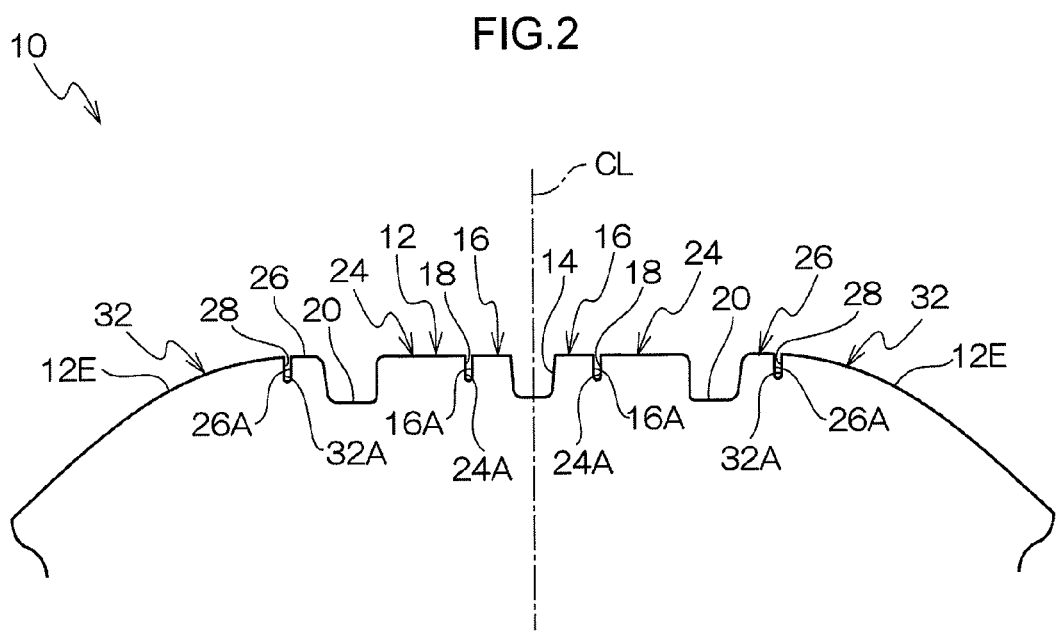
FIG. 2 is a cross-section of the external profile of a tread of a pneumatic tire of the first exemplary embodiment, as seen sectioned along the tire rotational axis.

It should be noted that the widths of the grooves for the first circumferential direction groove 14, the second circumferential direction grooves 20, and the center lug grooves 22 are set such that the grooves do not close even when the tread 12 is in contact with the ground and the ribs and blocks undergo compression deformation. In addition, the depth of these grooves is set to be the maximum groove depth on the tread 12 (see FIG. 2) in order to secure water expelling performance when running on a wet road.

The first fine grooves 18 have a narrower groove width than the first circumferential direction groove 14 and the second circumferential direction grooves 20, and this groove width is set such that a wall face 16A of the center ribs 16, this being the wall face of the first fine groove 18, makes contact with a wall face 24A of the center blocks 24 when the tread 12 makes ground contact and the center ribs 16 and the center blocks 24 are respectively undergo compressive deformation. It should be noted that the first fine grooves 18 of the present exemplary embodiment have substantially a constant groove width from the groove bottom up to the groove opening portion at the tread face side. The groove width of the first fine grooves 18 is, for example, preferably 1.0 mm or less. In the present exemplary embodiment the groove depth of the first fine grooves 18 is also set to be 50% of the groove depth of the first circumferential direction groove 14 and the second circumferential direction grooves 20.

First sipes 40 are formed in the surface of the center blocks 24, extending in the tire circumferential direction from a first wall face 24B on a center lug groove 22 side of the center block 24 toward a second wall face 24C on a center lug groove 22 side of the center block 24. One end of the first sipe 40 is open at a central portion of the first wall face 24B in the tire width direction, and the other end terminates within the center block 24 before reaching the central portion thereof in the tire circumferential direction.

Second sipes 42 are formed in the surface of the center blocks 24, extending in the tire circumferential direction from the second wall face 24C at the center lug groove 22 side toward the first wall face 24B, and bending (curving around) toward the first fine groove 18 side before reaching the central portion in the tire circumferential direction within the center block 24. One end of the second sipe 42 is open at a central portion of the wall face 24C in the tire width direction, and the other end of the second sipe 42 is open at a central portion of the wall face 24A in the tire circumferential direction, at the first fine groove 18 side.

The first sipes 40 and the second sipes 42 are formed to the center blocks 24 so as not to intersect with each other when the center blocks 24 are seen in plan view. In other words, the first sipes 40 and the second sipes 42 are formed so as not to section the center blocks 24 along the tire circumferential direction. In the present exemplary embodiment the portion of the second sipes 42 extending along the tire circumferential direction are formed to the center blocks 24 so as to be along the same straight line as the first sipe 40.

The depth of the first sipes 40 is preferably set so as to be the same as that of the first fine grooves 18 or shallower, and in the present exemplary embodiment is set to be the same as that of the first fine grooves 18. The depth of the second sipes 42 is preferably set so as to be the same as that of the center lug groove 22 or shallower, and in the present exemplary embodiment is set to be the same as that of the first sipe 40.

The reference to sipes here denotes a configuration closed when in contact with the ground, with the groove width becoming zero.

Second fine grooves 28 are formed extending along the tire circumferential direction at the tire width direction outside of the second circumferential direction grooves 20. Shoulder ribs 26 are partitioned between the second circumferential direction grooves 20 and the second fine grooves 28, extending continuously along the tire circumferential direction. Third sipes 36 that are shallower than the first circumferential direction groove 14 and the second circumferential direction grooves 20 are formed at intervals along the tire circumferential direction so as to cut across the shoulder ribs 26.

Plural shoulder lug grooves 30 are formed at the tire width direction outside of the second fine grooves 28, extending toward the tire width direction outside from the second fine grooves 28, and plural shoulder blocks 32 are partitioned by the second fine grooves 28 and the shoulder lug grooves 30.

The shoulder lug grooves 30 are smoothly curved, and if W is defined as the length along the tire width direction from the ground contact edge 12E to the wall face 32A at the second fine groove 28 side of the shoulder block 32, then with reference to a straight line HL (shown in FIG. 1 as a double dashed intermittent line) extending in the tire circumferential direction through a point at ⅓ W from the wall face 32A along the tire width direction toward the tire width direction, the shoulder lug grooves 30 are configured with a lug groove outside portion 30A that is the portion to the tire width direction outside of the straight line HL, and a lug groove inside portion 30B that is the portion to the tire width direction inside of the straight line HL. The lug groove outside portion 30A and the lug groove inside portion 30B have a different average angle with respect to the tire width direction, with the average angle of the lug groove outside portions 30A set smaller than the average angle of the lug groove inside portions 30B. It should be noted that the angle of a groove with respect to the tire width direction indicates here the angle of a center line passing through the center of the groove with respect to the tire width direction. In FIG. 1, the average angle of the lug groove outside portions 30A with respect to the tire width direction is shown by the angled single dashed intermittent line annotated L1, and the average angle of the lug groove inside portions 30B with respect to the tire width direction is shown by the angled single dashed intermittent line annotated L2. The angular difference θ between the intermittent line L1 and the intermittent line L2 is preferably set in the range of 10 to 70 degrees.

In a similar manner to the first fine grooves 18, the second fine grooves 28 have a narrower groove width than that of the first circumferential direction groove 14 and the second circumferential direction grooves 20. The groove width of the second fine grooves 28 is set such that a wall face 26A of the shoulder rib 26, which is a groove wall of the second fine groove 28, makes contact with the wall face 32A of the shoulder block 32 when the tread 12 makes ground contact and the shoulder ribs 26 and the shoulder blocks 32 respective undergo compressive deformation. In the second fine grooves 28 of the present exemplary embodiment the groove width is substantially constant from the groove bottom up to the groove opening portion at the tread surface side. The groove width of the second fine grooves 28 is, for example, preferably set at 1.0 mm or below. In the present exemplary embodiment the groove depth of the second fine grooves 28 is set at 50% of the groove depth of the first circumferential direction groove 14 and the second circumferential direction groove 20.

A circumferential direction length X2 of the shoulder block 32 along the tire circumferential direction is preferably set in the range of 20% to 80% of a circumferential direction length X1 of the center blocks 24 along the tire circumferential direction. In the present exemplary embodiment the circumferential direction length X2 of the shoulder block 32 is set as 50% of the circumferential direction length X1 of the center blocks 24. Note that the circumferential direction length of blocks in the present exemplary embodiment refers to an average value of values measured of the separation distance from one wall face to the other wall face at the lug groove sides of the block.

In the present exemplary embodiment the second circumferential direction grooves 20 are formed such that the center of the groove is positioned at about ¼ of the ground contact width from the tire equatorial plane CL toward the tire width direction outside, wherein the ground contact width is the distance along the tire width direction from the ground contact edge 12E at one side to the ground contact edge 12E on the other. The portion further to the inside in the tire width direction than the center of the second circumferential direction groove 20 is referred to as the center portion of the tread 12, and the portion to the tire width direction outside, including the central portion of the second circumferential direction groove 20, is referred to as the shoulder portion of the tread 12.

Explanation will now be given of the operation of the pneumatic tire 10. In the pneumatic tire 10, the tread 12 undergoes compressive deformation when the tread 12 contacts the ground, and the groove walls of the first fine grooves 18 make contact with each other, in other words the wall face 16A of the center ribs 16 make contact with the wall face 24A of the center blocks 24, the groove walls of the second fine grooves 28 also make contact with each other, in other words the wall face 26A of the shoulder ribs 26 makes contact with the wall face 32A of the shoulder blocks 32. The center ribs 16 thereby act so as to suppress deformation of the center blocks 24, and the shoulder ribs 26 act so as to suppress deformation of the shoulder blocks 32. Therefore, when force is input in the tire circumferential direction on a dry road, for example during braking, even if edge portions at the lug groove sides of the center blocks 24 and the shoulder blocks 32 attempt to curl up due to friction between the tread 12 and the road surface, the center rib 16 and the shoulder ribs 26 act to suppress deformation of the center blocks 24 and the shoulder blocks 32, respectively, suppressing curling up of the edge portions at the lug groove sides of the blocks. Consequently sufficient braking performance can be exhibited on a dry road.

When on a wet road, during braking the edges at the lug groove sides of the center blocks 24 and at the edges at the lug groove sides of the shoulder block 32 act effectively, exhibiting a braking effect.

In addition, since the water expelling ability when running on a wet road surface is raised by the first sipes 40 and the second sipes 42 extending along the tire circumferential direction of the block surfaces, sufficient braking performance can be exhibited. In particular, one end of the second sipes 42 is open to the center lug grooves 22, and the other end of the second sipes 42 is open to the first fine groove 18, therefore water that has been sucked in can be expelled to the center lug grooves 22 and the first fine grooves 18, and the water expelling performance can be effectively raised.

Furthermore, since the first sipes 40 and the second sipes 42 do not intersect with each other in plan view, in other words since the center blocks 24 are not sectioned at a central portion thereof along the tire circumferential direction by the first sipes 40 and the second sipes 42, a reduction in the rigidity in the tire width direction of the center blocks 24 can be suppressed, and a reduction in abrasion resistance of the center blocks 24 can be suppressed. The water expelling ability can thereby be raised while securing the abrasion resistance.

In addition, when force is input to the tread 12 in the tire width direction, for example during cornering, the input force is at a maximum at the shoulder blocks 32 at the outside of the vehicle turning radius, and these shoulder blocks 32 attempt to deform toward the tire width direction inside (toward the tire equatorial plane side). However the shoulder rib 26 that is adjacent to the shoulder block 32 at the tire width direction inside suppress deformation of the shoulder blocks 32 toward the tire width direction inside. Consequently heat generation caused by internal friction in the rubber configuring the shoulder blocks 32 is reduced, enabling rolling resistance to be lowered. A contribution toward a reduction in fuel consumption of the vehicle can thereby be made.

In the center blocks 24 at the central portion of the tread 12, since the center ribs 16 suppresses deformation in the tire width direction, heat generation in the center blocks 24 can be reduced, and a contribution can be made to a reduction in fuel consumption of the vehicle. In the pneumatic tire 10 of the present exemplary embodiment, during acceleration (or during deceleration), curling up of the edge portions at the lug groove sides of the center blocks 24 and at the edge portions at the lug groove sides of the shoulder blocks 32 can be suppressed.

When the circumferential direction length X2 of the shoulder blocks 32 is made 20% to 80% of the circumferential direction length X1 of the center blocks 24, braking performance can be effectively exhibited due to reducing the number of occasions for the edge portions at the lug groove sides of the center block 24 to attempt to curl up due to friction between the surface of the center blocks 24 and the road surface. It should be noted that when 80% is exceeded, the number of occasions for the edge portions at the lug groove sides of the center block 24 to attempt to curl up is too high, and when less than 20%, sufficient edge effect cannot be obtained since the number of edges at the lug groove sides of the center block 24 is reduced. In addition, in the present exemplary embodiment, since the circumferential direction length X2 of the shoulder blocks 32 is 50% of the circumferential direction length X1 of the center blocks 24, the number of occasions for the edge portions at the lug groove side of the center block 24 to attempt to curl up is effectively reduced.

By setting the angular difference θ between the intermittent line L1 and the intermittent line L2 in the range of 10 to 70 degrees, the flowing movement of rubber in the groove bottom of the shoulder lug grooves 30 is suppressed, and uneven wear that is readily generated in the shoulder blocks 32, such as heal and toe wear, is suppressed. The abrasion resistance of the shoulder portion of the tread 12 is thereby raised, and an increase in longevity of the pneumatic tire 10 is achieved.

Other Exemplary Embodiments

In the first exemplary embodiment configuration is made with portions of the second sipes 42 extending in the tire circumferential direction formed on the same straight line as the first sipes 40, however the present invention is not limited so such a configuration. The first sipes 40 and the second sipes 42 may be offset in the tire width direction, and configuration may be made with plural of the first sipes 40 formed in each of the center blocks 24.

In the exemplary embodiment described above, configuration is made with the depths of the first sipes 40 and the second sipes 42 the same as each other, however the present invention is not limited so such a configuration, and the depths of the first sipes 40 and the second sipes 42 may be different.

In the exemplary embodiment described above, configuration is made with the first sipes 40 and the second sipes 42 formed in the center blocks 24, however the present invention is not limited to such a configuration. The first sipes 40 and the second sipes 42 may be formed in the shoulder blocks 32 instead of in the center blocks 24, and obviously respective first sipes 40 and respective second sipes 42 may be formed in the center blocks 24 and in the shoulder blocks 32. When the first sipes 40 and the second sipes 42 are formed in the shoulder blocks 32, configuration is made such that the other end of the second ripe 42 is open at a wall face at the second fine groove 28 side of the shoulder block 32.

Embodiments of the present invention have been explained above by way of an exemplary embodiment, however this is only an example, and various modifications can be made within a scope not departing from the spirit of the invention. Obviously the scope of rights of the present invention is not limited to the exemplary embodiment.

Tests

In order to confirm the effect of the present invention, a Comparative Example Pneumatic Tire and an Example Pneumatic Tire applied with the present invention were prepared, braking performance tests were carried out on a wet road surface, braking performance tests were carried out on a dry road surface, the rolling resistance value was measured, and abrasion resistance was evaluated for each of the test tires.

Example Pneumatic Tire: a pneumatic tire having the tread pattern as explained in the above exemplary embodiment.

Figure 3:
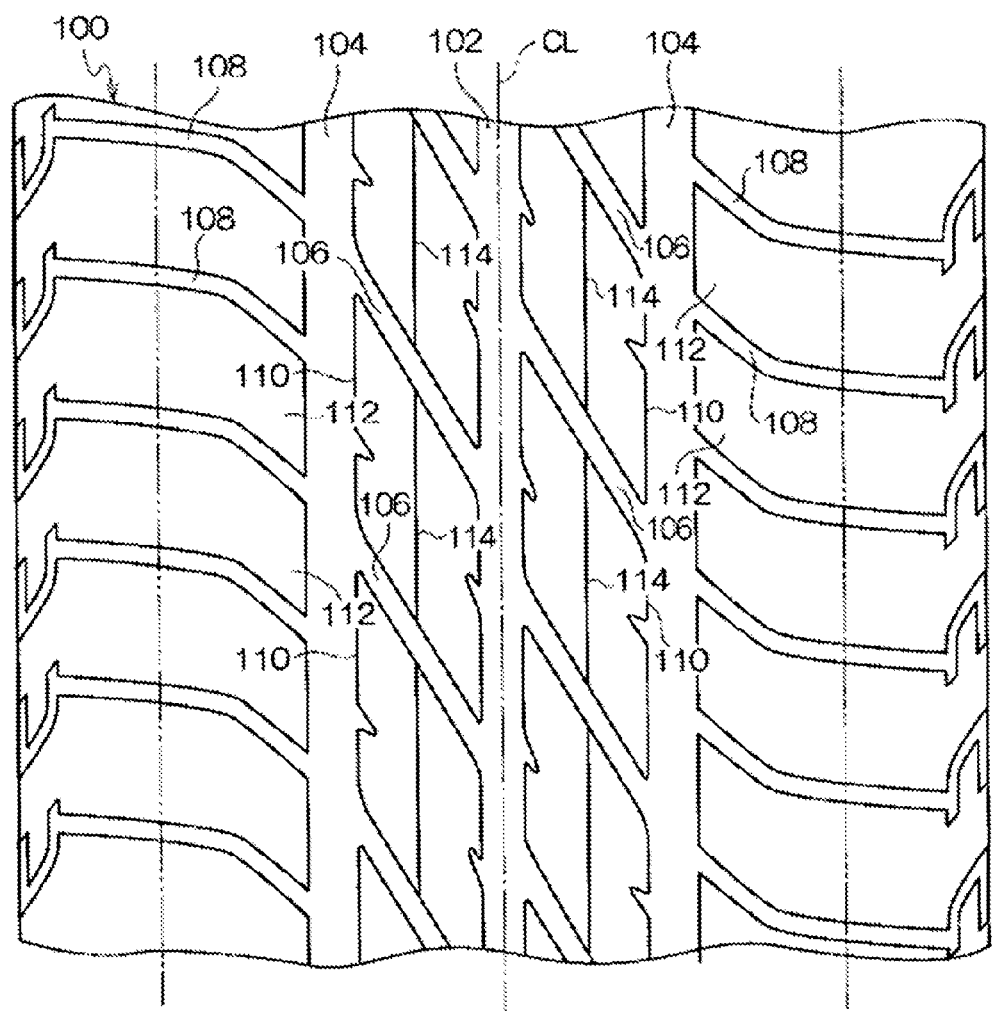
FIG. 3 is a plan view of a tread of a pneumatic tire of a Comparative Example.

Comparative Pneumatic Tire: a pneumatic tire with a tread pattern as shown in FIG. 3. FIG. 3 shows a tread 100, circumferential direction grooves 102, 104, lug grooves 106, 108, blocks 110, 112, and sipes 114. The circumferential direction grooves 102, 104 have substantially the same groove depth and groove width as those of the circumferential direction grooves of the Example.

Each of the test tires here is a 195/65R15 tire size, assembled to a rim of rim width 6J-15 and mounted to a Japanese made sedan, and the test were performed under load conditions of the additional weight of the driver at 600N, and with air filled to the stipulated internal pressure for the vehicle.

In the brake test the deceleration from 100 km/h was measured to the point where the ABS function activated. The evaluation is shown as an index with the deceleration when mounted with the Comparative Pneumatic Tire taken as 100, and with higher index values indicating a greater deceleration and superior braking performance.

Measurements of rolling resistance were measurements of rolling resistance when the tire alone was rotated in a test rig under the same conditions as above. The evaluation is shown as an index with the inverse of the rolling resistance of the Comparative Pneumatic Tire taken as 100, with higher index values indicating lower rolling resistance.

The abrasion resistance evaluation was by measurement of the amount of wear of each of the blocks after completing the braking test, and deriving an average figure therefrom. The evaluation is shown as an index with the inverse of the average value of the amount of wear of the Comparative Pneumatic Tire taken as 100, and with higher index values indicating less wear, namely superior abrasion resistance.

TABLE 1

|  | Comparative Example | Example |
|---|---|---|
| Rolling Resistance | 100 | 110 |
| DRY Braking Performance | 100 | 105 |
| WET Braking Performance | 100 | 120 |
| Abrasion Resistance | 100 | 105 |

It can be seen from the results of these tests that, in comparison to the comparative pneumatic tire, the Example Pneumatic Tire applied with the present invention has substantially increased braking performance on a dry road surface and a wet road surface, a substantial reduction in rolling resistance can be achieved, and also sufficient abrasion resistance can be secured.

The invention claimed is:

1. A pneumatic tire comprising:

a plurality of circumferential direction grooves formed in a tread and extending along a tire circumferential direction;

a fine groove formed in the tread between the circumferential direction grooves so as to partition a rib extending in a tire circumferential direction, the fine groove having a width that is narrower than the circumferential direction grooves, and the groove walls of the fine groove making contact with each other when the tread makes contact with the ground and undergoes compressive deformation;

a plurality of lug grooves formed in the tread, the lug grooves extending from the fine groove in a direction that intersects with the fine groove, and partitioning blocks adjacent to the rib;

first sipes that are formed in the surface of the blocks, extending along the tire circumferential direction from a first wall face at a lug groove side of the block toward a second wall face at a lug groove side of the block, with the first sipes terminating within the block;

second sipes that are formed in the surface of the blocks, the second sipes extending along the tire circumferential direction from the second wall face at a lug groove side of the block toward the first wall face at a lug groove side of the block, and the second sipes curving around, at an intermediate portion between the second wall face and the first wall face, toward a wall face at the fine groove side of the block, with the second sipes open to the wall face at the fine groove side and not intersecting with the first sipes when seen in plan view, wherein a portion of the second sipes extending along the tire circumferential direction are formed to the blocks so as to be along the same straight line as the first sipe.

2. The pneumatic tire of claim 1, wherein the blocks are respectively partitioned into blocks on a central portion of the tread and blocks on shoulder portions of the tread at the outside on both sides of the central portion in the tire width direction;

and the length of the blocks on the shoulder portions in the tire circumferential direction is a length that is 20% to 80% of the length of the blocks on the central portion in the tire circumferential direction.

\* \* \* \* \*